Figure 1:
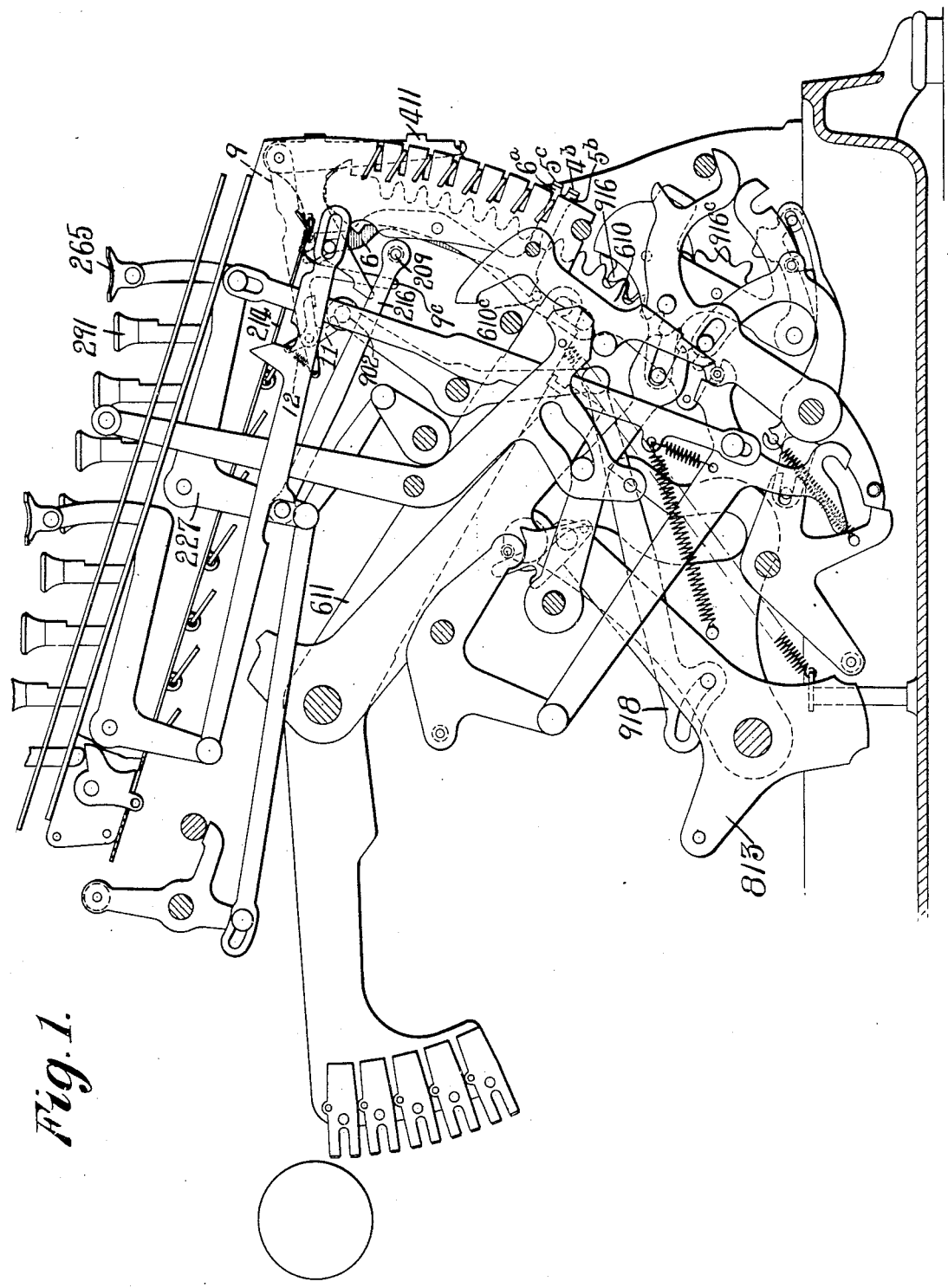

J. MAGNUS.
ADDING MACHINE.
APPLICATION FILED FEB. 3, 1919.

1,396,716.

Patented Nov. 8, 1921.

3 SHEETS—SHEET 1.

INVENTOR
John Magnus
BY
Rector Hibben Davis Macauley
his ATTORNEYS

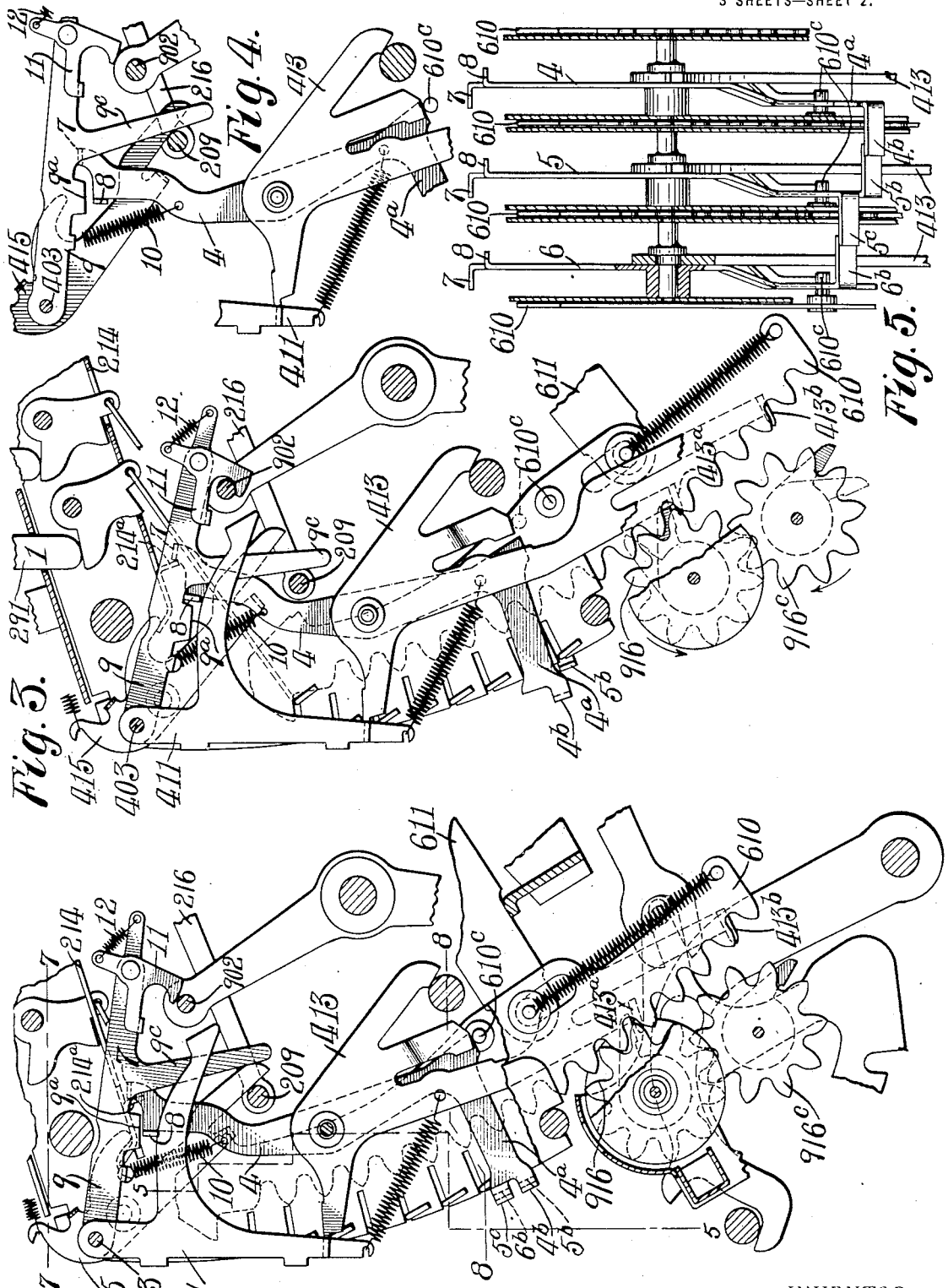

J. MAGNUS.
ADDING MACHINE.
APPLICATION FILED FEB. 3, 1919.

1,396,716.

Patented Nov. 8, 1921.

3 SHEETS—SHEET 3.

UNITED STATES PATENT OFFICE.

JOHN MAGNUS, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,396,716.     Specification of Letters Patent.     Patented Nov. 8, 1921.

Application filed February 3, 1919. Serial No. 274,591.

*To all whom it may concern:*

Be it known that I, JOHN MAGNUS, a citizen of the United States, residing at Detroit, in the county of Wayne and State of Michigan, have invented certain new and useful Improvements in Adding-Machines, of which the following is a specification.

The object of the present invention is to facilitate computing of meter-readings on an adding machine, having particular regard to the over-running of the meter capacity and the necessity for arriving at "amount consumed" which may be the sum of the "present" reading and the difference between the "previous" reading and the decimal capacity of the meter. For example, with a four dial meter and a "previous" reading of 4700 and a "present" reading of 1000, the amount consumed would be 6300 or, strictly speaking, 630000,—taking into account the two ciphers which it is customary to have already printed on the bill.

Assume, then, a six bank adding machine with direct substracting mechanism, that is to say, a machine having a fairly wide range of usefulness, and such "present" reading of 1000 would be set up with the machine in adding condition and the machine then operated in the ordinary way, so that the 1000 would be additively registered upon the wheels and printed upon the bill; then the "previous" reading of 4700 would be set up after having put the machine in subtracting condition, and upon operation of the machine, the 6300 would be registered by backward turning of the numeral wheels, that is to say, this registration would appear upon the four numeral wheels to the right. However, the borrowing action resultant from the backward turning past zero of the fourth wheel, will have caused 9's to appear upon the fifth and sixth wheels, which is obviously undesirable.

My invention makes provision for eliminating the registration of 9's upon higher order wheels, which I accomplish by interfering with or blocking the carrying or borrowing action under control of the amount keys, so that the matter is regulated by the number of banks or rows of keys which the work in hand requires. It will be understood that operations of an adding and substracting machine such as above mentioned involve printing of the subtractively registered "previous" reading after the printing of the additively registered "present" reading, and then thereafter the printing of the "amount consumed" by way of a total-taking operation. My invention provides for restoration to normal of the carry-intercepting means, as an incident to the total-taking operation.

In the drawings which accompany and form part of this specification, Figure 1 represents a left-side sectional elevation of an adding and substracting machine in which my present invention is embodied, all parts being shown at normal with the machine in adding condition; Fig. 2 represents a right-side sectional elevation of the forward part of the machine and with breaking away of certain parts; Fig. 3 is a similar view, but with certain carry-intercepting devices out of normal; Fig. 4 represents certain of the parts as affected by depression of the total key; Fig. 5 is a vertical cross-section taken substantially on the line 5—5 of Fig. 2; Fig. 6 is a view similar to Fig. 3, but with the registering mechanism in subtracting condition; Fig. 7 is a sectional plan view taken substantially on the line 7—7 of Fig. 2; Fig. 8 is a sectional plan view taken substantially on the line 8—8 of Fig. 2; Figs. 9 and 10 show examples of work.

My invention is here shown applied to an adding and substracting machine of the kind disclosed in the Rinsche Patent 1,179,564 issued April 18, 1916, and in view of the close correspondence between the registering mechanism here shown and that disclosed and fully described in said patent, it will be unnecessary to repeat the description here. The machine here shown is of six bank capacity, as may be observed upon reference to Fig. 8, where the six numeral wheels appear. All of the devices associated with the first three wheels are regular, that is, they are not in any respect different from the well-known devices and it is only in connection with the three higher orders, or the three left-hand numeral wheels, that the special equipment supplied by my invention comes into play. In these higher orders I provide for intercepting carry-transmission under control of the amount keys.

As an aid in identifying certain familiar machine elements, I shall use reference characters which have been employed heretofore and which in most instances are symbol numbers by which these parts are commercially known. The numeral keys are designated 291 and slide bars which they shift rearward, by the numeral 214, and the racks by the numeral 610, and their operating levers by the numeral 611,—there being the usual slot-pin-and-spring connection between the racks and the levers for zero type setting and transfer or carry purposes. The numeral 413 designates the usual so-called transfer pawl which has a leg normallly standing over the rack stud 610°. As in the construction of the said Rinsche patent, the pawl has two tripping feet 413ª and 413ᵇ at the bases of legs on the long forward branch of the pawl, the upper foot cooperating with the cam of the associated numeral wheel pinion 916 and the lower foot coöperating with the cam of the intermediate or subtraction pinion 916°,—all as fully described in said Rinsche patent. In carrying out my invention I provide adlitional pawls for the fourth, fifth and sixth order racks, which may serve to block carrying action of said racks, notwithstanding the tripping of the regular pawls 413. Each of these additional pawls is of lever form, and they are pivoted upon the same studs as the regular pawls. They are designated respectively, 4, 5, and 6. Normally the foot of each pawl stands over the stud 610ᶜ of the associated rack overlapping the foot of the regular pawl, as shown in Fig. 2. The upper arm of each of these pawl levers has a lug 7 projecting to the left (Fig. 5) behind a lug 214ª (Fig. 2) of the associated slide strip or bar 214. Consequently when said bar is shifted rearward as the result of depression of a key, the pawl-lever is rocked clockwise and its foot removed from over the rack-stud 610ᶜ. This effect is illustrated in Fig. 3 where the 1 key of the fourth bank or row is represented as depressed,—this having reference to the example hereinbefore given of a "present" reading of 1000, which example, in subtractive registration of the "previous" reading, requires a borrowing action of the rack in the order to which this said key belongs. Depression of a key in this order does not, however affect the other pawl-levers 5 and 6 whose feet would remain over the respective rack studs and intercept any carrying action of their racks and so, in the example before mentioned, prevent the turning of the higher order wheels to the 9 position, and so prevent display and printing of the objectionable 9's in the "amount consumed". However, in the case of employing the fifth bank of keys (as when dealing with a meter of higher capacity by one decimal place) both the pawl-lever of that order and the pawl-lever of the fourth order will be disabled, and in the case of employing the sixth bank of keys, (as when dealing with a meter of still higher capacity) all three pawl-levers will be disabled. This is provided for by forming the pawl-lever 4 with a leftwardly extending finger 4ᵇ (Fig. 5) upon its forwardly projecting arm 4ª, said finger overlapping a rightwardly projecting finger 5ᵇ on a similar arm 5ª of the pawl-lever 5, which arm has also a leftwardly projecting finger 5ᶜ which overlaps a rightwardly projecting finger 6ᵇ on a similar arm 6ª of the pawl-lever 6, all as most clearly illustrated in Fig. 5. Manifestly clockwise swinging of the lever 6 will carry with it the levers 5 and 4 and clockwise swinging of the lever 5 will not affect the lever 6, but will carry with it the lever 4.

Inasmuch as the carrying action to be intercepted would not occur until the machine is operated the second time, that is, subtractively operated after the adding operation, it is necessary to latch any displaced pawl-lever, for otherwise it would return to normal position with the restoration of the depressed key. Therefore each pawl-lever has a lug 8 projecting to the right at its upper end, for cooperation with a latch. Each of these latches is alike and a description of one of them will suffice. It is in the form of an arm 9 pivoted upon the same cross-rod 403 from which depend the familiar latches 411 for the regular transfer pawls. A spring 10 connects the supplemental pawl-lever with the latch-arm, said spring normally holding the upper arm of the pawl-lever forward, and its lower arm rearward, as illustrated in Fig. 2. The lug 8 of the pawl lever then stands below a foot 9ª formed upon the under-side of the latch-arm. When the key is depressed and the pawl-lever rocks clockwise as before described, the lug 8 moves to the rear of said foot, but the latch arm does not immediately drop. This would be undesirable because the key may perchance be erroneously depressed and a correction required involving a restoration of the pawl-lever. So the latch-arm is normally upheld in opposition to the spring 10 by the engagement of the foot of a wiper-pawl 11 with the cross rod 902 of a familiar bail whose regular function is to unlatch the transfer pawls 413 by operating upon rearwardly projecting arms of the regular latches 411. The normal condition is illustrated by Fig. 2, the wiper-pawl 11 being held in the position there shown by a spring 12. Said wiper pawl is pivoted to the latch-arm and has a forwardly extending branch with a limit lug extending under the edge of the latch arm. Forward swinging of the aforesaid familiar bail occurs at the end of the first half cycle of the machine's operation. A stud carried by the familiar arm 813 (Fig. 1) operates against the rear end of a slot in a link 918 which is connected to a depending arm of the said bail. Therefore, assuming the machine to be hand-operated, at the end of the forward stroke of the operating handle, the bail cross rod 902 would move away from the foot of the wiper-pawl 11, whereupon the latch-arm would drop and its foot 9ª be interposed in front of the lug 8 of the pawl-lever as illustrated in Fig. 3, though there the bail has gone back to normal and a condition is illustrated that comes about when the handle has made its return stroke. The lowered position of the wiper-pawl enables said cross-rod in its return to normal, to enter a notch above the foot of the wiper-pawl without any other effect than to slightly tilt said pawl. The rack seen in Fig. 3 is that of the fourth order and it has lowered a single step in response to depression of the 1 key and is about to be moved upwardly that one step to turn its numeral wheel from 0 to 1. The regular transfer pawl 413 belonging to this fourth order is here shown with the legs of its long branch broken away, the dotted continuation being intended to represent the corresponding legs of the transfer pawl 413 of the fifth order,—the one upon which the cams of the fourth order pinions operate. Likewise, the small dotted circle above the full-line stud 610ᶜ represents the stud on the fifth order rack. Fig. 6 illustrates a condition resultant from the second or subtracting operation of the machine. Here the lower part of the third order rack is shown, the same being in normal position with its stud against the foot of the associated regular transfer pawl which is here illustrated as broken away so that the fourth order transfer pawl will more fully appear. The same example before described may be here assumed and therefore a borrowing from the fourth wheel, so that this fourth order transfer pawl is shown swung rearward and the fourth order rack, (the upper portion of which appears) is illustrated as having partaken of excess upward movement, its stud being shown in dotted line as having passed upwardly beyond the foot of the transfer pawl. It will be noted that the supplemental pawl-lever 4 is still latched out of effective position as in Fig. 3.

When this second (subtracting) operation of the machine has been performed, it is to be understood that there will have been printed upon the bill the "present" reading and below that the "previous" reading, as illustrated in Figs. 9 and 10, and then the "amount consumed" is to be printed by way of a total-taking operation. As well understood by those familiar with this art, the Burroughs type of carrying mechanism here illustrated requires that, before a total is taken, there must be a blank operation of the machine. The before-mentioned bail cross-rod 902 functions in this connection to unlatch any displaced carrying pawls 413, so that they may reengage over the studs of racks that may have been moved upwardly beyond normal position for carrying purposes in the previous operation, and are again depressed in this blank operation of the machine. Such latter operation does not affect any displaced pawl-lever of the special set supplied by the present invention, and the condition illustrated in Figs. 3 and 6 would still obtain as to relationship between the displaced pawl-lever 4, the latch-arm 9, and the bail cross-rod 902. However, upon depression of the total key, which act is permissible after the blank operation has occurred, the displaced pawl-lever will be released. The total key is designated 265 in Fig. 1, and the lever 227 which it surmounts has coupled to it, as usual, a link 216 which constitutes one side member of a bail whose cross rod 209 serves the familiar purpose of withdrawing the latches or detents 415 that normally hold up the racks. I utilize that same bail cross-rod for unlatching the supplemental pawl-levers. Thus each of the latch-arms 9 is formed with a depending finger 9ᶜ which extends in rear of said bail cross-rod, so that when the latter is drawn rearward through depression of the total key, any lowered latch-arm will be raised and its associated pawl-lever released and swung counterclockwise to its normal position by its spring 10. In this operation the wiper-pawl 11 is simply wiped past the other bail cross-rod 902, the spring 12, yielding so that when the latch-arm is elevated to the position shown in Fig. 4, the foot of the wiper-pawl will swing forward to a position over said bail cross-rod 902, and then when the total key restores to normal and the bail cross-rod 209 moves forward, the said latch-arm will lower and the foot of the wiper-pawl again rest upon the cross-rod 902 as illustrated in Fig. 2.

It should be further noted that, in the event of depression of a key in the fourth order and the consequent rearward shift of the upper arm of the pawl-lever 4 and then thereafter the dropping of the associated latch-arm 9 upon forward swinging of the bail cross-rod 902 as before described, the latch-arms 9 of the two higher orders, being also deprived of the support of said cross-rod 902, will lower but only to a very slight extent inasmuch as their associated pawl-levers 5 and 6 remain at normal and consequently their feet 9ª come to rest upon the lugs 8 of their respective pawl-levers 5 and 6. This slight downward displacement of these higher order latch-arms is not sufficient to disturb the relationship between their wiper-pawls 11 and the bail cross-rod 902 so that when the latter returns rearward to its normal position it will act upon the said wiper-pawls and restore these latch-arms to their fully elevated normal position. In this connection it should be noted that the lower edges of said wiper-pawls are given an outward curvature which is for the purpose of insuring the proper coaction between them and the said bail cross-rod for effecting restoration of the latch-arms to their normal position.

Reverting to the example before given and which is illustrated by Fig. 9, it will be obvious that in the subtracting operation, borrowing by the third wheel from the fourth will be in order and will occur under the construction here shown and described, so that the registration on the fourth wheel will be 6 instead of 7. It will furthermore be obvious that as the fourth wheel necessarily turns backward beyond zero, it will trip the regular transfer pawl which controls the fifth rack. However, the fifth rack will not partake of the carrying or borrowing movement, for the reason that no key was depressed in the fifth order and consequently the supplemental pawl-lever 5 remained in its normal position blocking the fifth order rack, and the same thing is, of course, true as to the sixth order. Consequently instead of the fifth and sixth order wheels being turned backward from 0 to 9, as would ordinarily be the case, they remain at their zero positions, and in the total-taking operation nothing at all will be printed in the fifth and sixth orders, but the printing will be 6300, and then there will be the two additional ciphers commonly printed upon the bill which would make the amount consumed as it appears in Fig. 9. The Fig. 10 example is one wherein the meter capacity has not been exceeded, the previous reading being 275 and the present reading 1000, so that the amount consumed would be 725. The subtracting operation in which the previous reading of 275 is recorded, involves a borrowing by the third wheel from the fourth, but the fourth wheel is simply moved backward from 1 to 0 and so would not shift the regular transfer pawl which controls the rack of the fifth order, and consequently the pawl-levers 5 and 6 would not be required to function in this particular instance.

It will now be seen that the above described construction fulfils the object primarily stated, that is to say, it provides for correctly registering and recording the amount consumed where it is the sum of the present reading and the difference between the previous reading and the meter capacity, while at the same time the capacity of the adding machine is not reduced to that of the meter, but is such as to provide for a much wider range of usefulness, as *e. g.*, when dealing with meters of higher than four decimal-place capacity.

I claim:

1. In a machine of the class described, the combination with register wheels, means for turning the same, manipulative amount-determining means, means automatically effecting one-step movement of a higher order wheel upon turning of the next lower wheel between zero and nine, of additional means normally intercepting such action in one or more higher orders, and means for disabling said additional means operable only upon manipulation of amount-determining means in such order or orders.

2. In a machine of the class described, the combination with register wheels, means for turning the same, manipulative amount-determining means, and carry transmitting devices between wheels; of means, under control of said amount-determining means, for intercepting carry-transmissions, with provisions for effecting disablement of lower order intercepting means by higher order intercepting means.

3. In a machine of the class described, the combination with register wheels, means for turning the same, manipulative amount-determining means, carry transmitting devices between wheels, and total-taking mechanism; of means, under control of said amount-determining means, for intercepting carry-transmission, together with provisions for resetting to normal said carry-transmission intercepting means by the total-taking mechanism.

4. In a machine of the class described, the combination with register wheels, means for turning the same, manipulative amount-determining means, carry transmitting devices between wheels, and total-taking mechanism; of means normally set for intercepting carry-transmission, together with provisions for disabling the same by manipulation of amount-determining means, and provisions for resetting of disabled intercepting means by the total-taking mechanism.

5. In a machine of the class described, the combination with register wheels, racks to turn the same, amount keys for measuring rack-movements, actuator bars for the racks with provisions for one-step independent movement of the latter, means normally preventing such movement and tripped by wheels turning between zero and nine; of a supplemental member or members normally preventing the independent rack-movement in a higher order or higher orders, and an amount-key-operated member or members to trip said supplemental member.

6. The claim 5 combination, together with a latch for holding the supplemental member tripped.

7. The claim 6 combination, together with a regularly moving machine element, and provisions for restraining the latch by the latter when in normal position.

8. In a machine of the class described, the combination with register wheels, racks to turn the same, amount keys for measuring rack-movements, actuator bars for the racks with provisions for one-step independent movement of the latter, means normally preventing such movement and tripped by wheels turning between zero and nine, and total-taking mechanism; of a supplemental member normally preventing the independent rack movement, and an amount-key-operated member to trip said supplemental member, together with provisions for unlatching the supplemental member by the total-taking mechanism.

9. In a machine of the class described, the combination with register wheels, racks to turn the same, amount keys for measuring rack-movements, actuator bars for the racks with provisions for one-step independent movement of the latter, means normally preventing such movement and tripped by wheels turning between zero and nine, a regularly moving machine element, and total-taking mechanism; of a supplemental member normally preventing the independent rack-movement, an amount-key-operated member to trip said supplemental member, a latch for holding the supplemental member tripped, provisions for restraining the latch by the aforesaid regularly moving machine element when in normal position, and provisions for restoring normal relationship between said element and the latch by the total-taking mechanism.

10. The claim 5 combination, in which the supplemental member is pivoted and spring-held, and a pivoted latch engages it when tripped.

11. The claim 10 combination, together with a pivoted abutment member on the latch, and a regularly moving machine element on which said abutment member normally bears.

12. The claim 11 combination, in which the abutment member is a spring-held wiper-pawl, and the machine element is a bail upon whose cross-rod said pawl normally rests; together with total-taking mechanism and connections including a bail operating to restore the latch wiping its pawl past said cross-rod.

13. The claim 5 combination, with a number of pivoted members having overlapping portions whereby they trip each other in a direction from higher to lower orders.

JOHN MAGNUS.